July 1, 1941.  J. R. KIRKPATRICK  2,247,689
LIQUID FUEL BURNING APPARATUS
Filed April 15, 1939  6 Sheets-Sheet 1

Fig. 1.

INVENTOR.
BY JOSEPH R. KIRKPATRICK
Hull, Brock & West
ATTORNEYS.

Fig. 4.

July 1, 1941.  J. R. KIRKPATRICK  2,247,689
LIQUID FUEL BURNING APPARATUS
Filed April 15, 1939  6 Sheets-Sheet 4

INVENTOR.
JOSEPH R. KIRKPATRICK
BY Hull, Brock & West
ATTORNEYS.

July 1, 1941.  J. R. KIRKPATRICK  2,247,689
LIQUID FUEL BURNING APPARATUS
Filed April 15, 1939  6 Sheets-Sheet 5

Fig. 7.

INVENTOR.
BY JOSEPH R. KIRKPATRICK
Hull, Brock & West
ATTORNEYS.

July 1, 1941.  J. R. KIRKPATRICK  2,247,689
LIQUID FUEL BURNING APPARATUS
Filed April 15, 1939  6 Sheets-Sheet 6

FIG. 8.

INVENTOR.
JOSEPH R. KIRKPATRICK
BY
Hull, Brock & West
ATTORNEYS.

Patented July 1, 1941

2,247,689

UNITED STATES PATENT OFFICE 2,247,689

LIQUID FUEL BURNING APPARATUS

Joseph R. Kirkpatrick, South Euclid, Ohio, assignor to Perfection Stove Company, Cleveland, Ohio, a corporation of Ohio Application April 15, 1939, Serial No. 268,138

5 Claims. (Cl. 158—36)

This invention pertains to liquid fuel burning apparatus that is especially suitable for use in furnaces of heating systems for houses or other buildings, and whose operating range includes low and relatively higher fires, and in which, through suitable fuel feeding and governing means, the burner is constantly supplied with fuel—at no time, so long as the apparatus is in operation, with less than enough to sustain operation at low fire, and at other times with sufficient additional fuel to produce higher fire.

Customarily, in apparatus of the class to which the invention relates, liquid fuel of a rather heavy grade is used, such as that known as fuel oil; and at low fire, which practically amounts to pilot flame, very little fuel is required. For example: in the average size furnace burner, from one-half to one gallon of fuel is fed every twenty-four hours for the purpose of sustaining operation at low fire, and this amounts to very considerably less than one drop per second. Consequently, uniform feeding of the fuel at so low a rate presents a problem rendered difficult by several factors including variation in viscosity of different fuels; in the differences in viscosity of the same fuel at different temperatures, or the presence of sediment or foreign matter in the fuel. Under any circumstances, and especially those requiring accurate feeding of a very small quantity of fuel, the customary control of the flow by means of orifices (as is the case in practically all types of valves) is quite unsatisfactory and unreliable.

It is the fundamental object of my invention to provide liquid fuel burning apparatus of the character referred to in which the fuel, especially that for supplying low or pilot fire, is volumetrically fed—that is to say, is fed in measured quantities. In its present preferred form, the volumetric feeding means comprises one or more dippers. Where only low or pilot fire is supplied with fuel by the volumetric feeding means, a single dipper is used, the fuel supply for higher fire being controlled by suitable valve means; and where the entire fuel supply for the burner is volumetrically fed, a plurality of dippers is employed.

The invention may be defined, broadly, as comprising, with a liquid fuel burner and a source of liquid fuel supply, a fuel feeding and governing system through which the source communicates with the burner, and a part of which system serves as a reservoir to which fuel is delivered from the source, and a delivery part leading to the burner that is separated by a barrier from the reservoir part so as to preclude natural flow of the fuel directly from the latter to the former by gravity. A suitable liquid level control maintains a substantially constant fuel level in the reservoir part, and by suitable transfer means, as by the dipper or dippers above mentioned, measured quantities of fuel are transferred from the reservoir part to the delivery part of the system whence the fuel flows by gravity to the burner. A motor or other appropriate means—desirably a small electric motor—has suitable driving connection with the dipper or dippers for oscillating the same, the one for supplying fuel to the low or pilot fire being constantly actuated so long as the apparatus is in operation.

Another object of the invention is to provide an automatic control by means of which the apparatus is caused to operate under certain conditions at intermediate fire, so to speak, thereby to maintain a given temperature, within rather close limits, in a space to be heated—as in a room, apartment or other enclosure—and which, in case the temperature of said space drops below a predetermined value, will act to cause an increase in the fuel supply to the burner so as to produce a higher fire; and in case the temperature of said space rises above a predetermined value, will function to suspend operation of all but the volumetric feeding means that supplies fuel for low or pilot fire, thereby to reduce the heat output of the apparatus.

A further object is to provide, in an automatically controlled apparatus of the character described, means for effecting delivery of fuel to the burner in sufficient quantity to sustain operation thereof at approximately intermediate fire in case of failure of the automatic control; for example, by the stoppage or suspension of the supply of current, in case the control system is electrical.

A still further and more limited object of the invention is to provide fuel feeding and governing means in the form of a compact unit that is convenient of incorporation in a liquid fuel burning apparatus and is so constructed as to facilitate assembly and installation and that is efficient and reliable in operation.

The foregoing objects, with other and more limited ones hereinafter appearing, are attained in the embodiments of the invention illustrated in the accompanying drawings wherein.

The installations diagrammatically illustrated in the drawings may be parts of heating systems for dwellings or other buildings and desirably involve means for automatically controlling the operation of the burner so as to maintain, in the space or apartment heated by the system, a substantially constant temperature within relatively close limits.

According to the present illustrative embodiments, the burners are of the pot or bowl variety, and in each of the two cases (Figs. 1 and 7) the burner, designated, generally, by the reference character A, comprises a bowl 1 that is suitably supported with its top wall 2 in spaced relation to the bottom wall 3 of the combustion chamber 4. Said walls have aligned openings shown as surrounded by depending flanges 2ª and 3ª, respectively, that are in concentric, spaced relation to each other and define a slot 5 for the admission of secondary air to the burner bowl, as will hereinafter more fully appear. Primary air is admitted to the bowl through perforations 6 in the peripheral wall of the bowl. A relatively large lighting and cleanout opening is formed in said wall and the same is surrounded by a radially projecting neck 8 normally closed by a plug 9 shown as having a bayonet joint connection with the neck. The combustion apparatus comprising the bowl 1 and chamber 4 may be that of a furnace of appropriate type for use in systems of the class above mentioned. For more detailed information on such apparatus, reference may be had to Letters Patent Nos. 1,944,593, 1,979,865, 1,987,179 and 2,000,884, dated January 23, 1934, November 6, 1934, January 8, 1935, and May 7, 1935, respectively.

Figure 7:
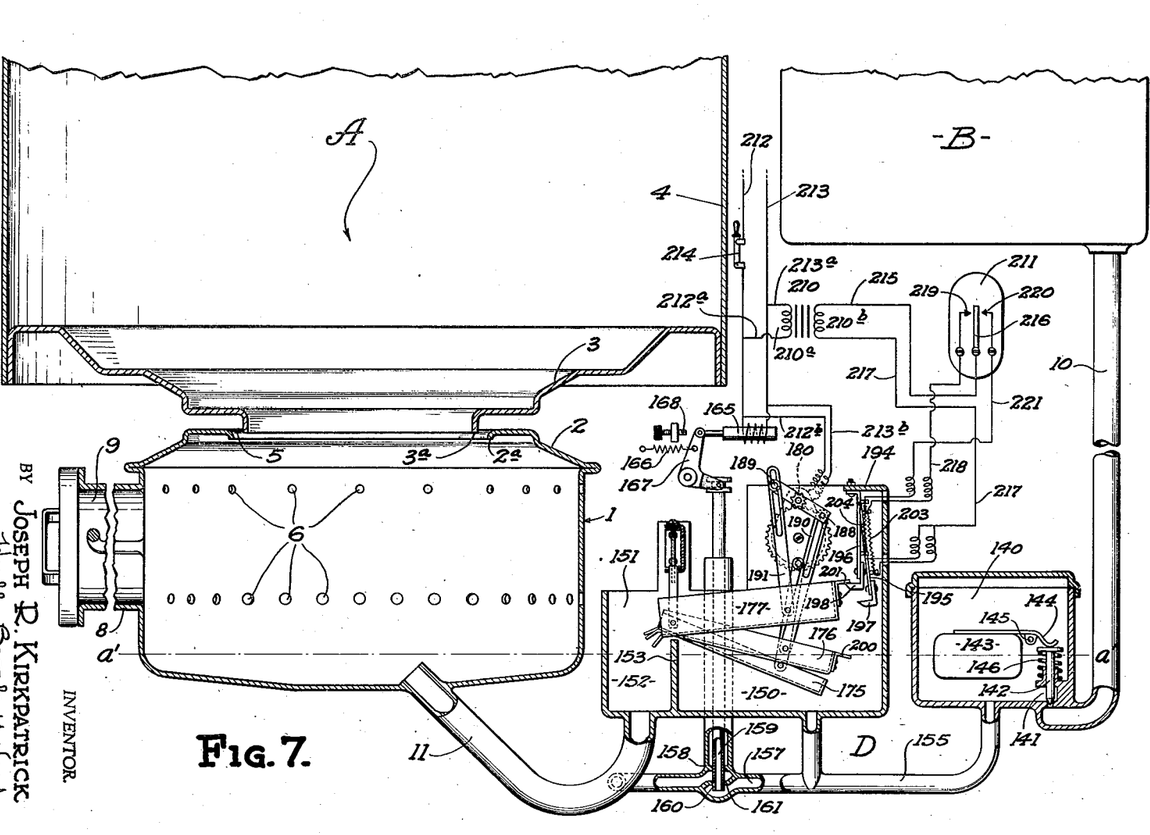
Fig. 7 is a view similar to Fig. 1 illustrating a form of the invention characterized by a fuel feeding and governing system in which the fuel is supplied to the burner throughout its entire range of normal operation by a multiple volumetric fuel feed comprising a plurality of dippers.

Liquid fuel is supplied to the burner A from a source B (represented as a tank) through a fuel feeding and governing system C (Fig. 1) or D (Fig. 7). In each instance, a conduit 10 leads from said source to the system, and a conduit 11 leads from the system to the burner, the latter conduit being shown as opening through the bottom wall of the bowl 1. Each system involves a reservoir part, to which fuel is supplied through said conduit 10; a liquid level control that tends to maintain a constant liquid level in said reservoir part, and a delivery part that communicates with the burner through the aforesaid conduit 11.

The system C (Fig. 1) includes a float chamber 20 to the bottom of which the conduit 10 is connected and with which said conduit communicates through a port 21 controlled by a valve 22. A spring 23 tends to lift the valve from its seat, and the valve is closed by a float 24 that is carried by a lever 25, fulcrumed on a pivot pin 26 suitably supported in the valve chamber. The end of the lever remote from the float bears against the head of the valve 22.

Figure 1:
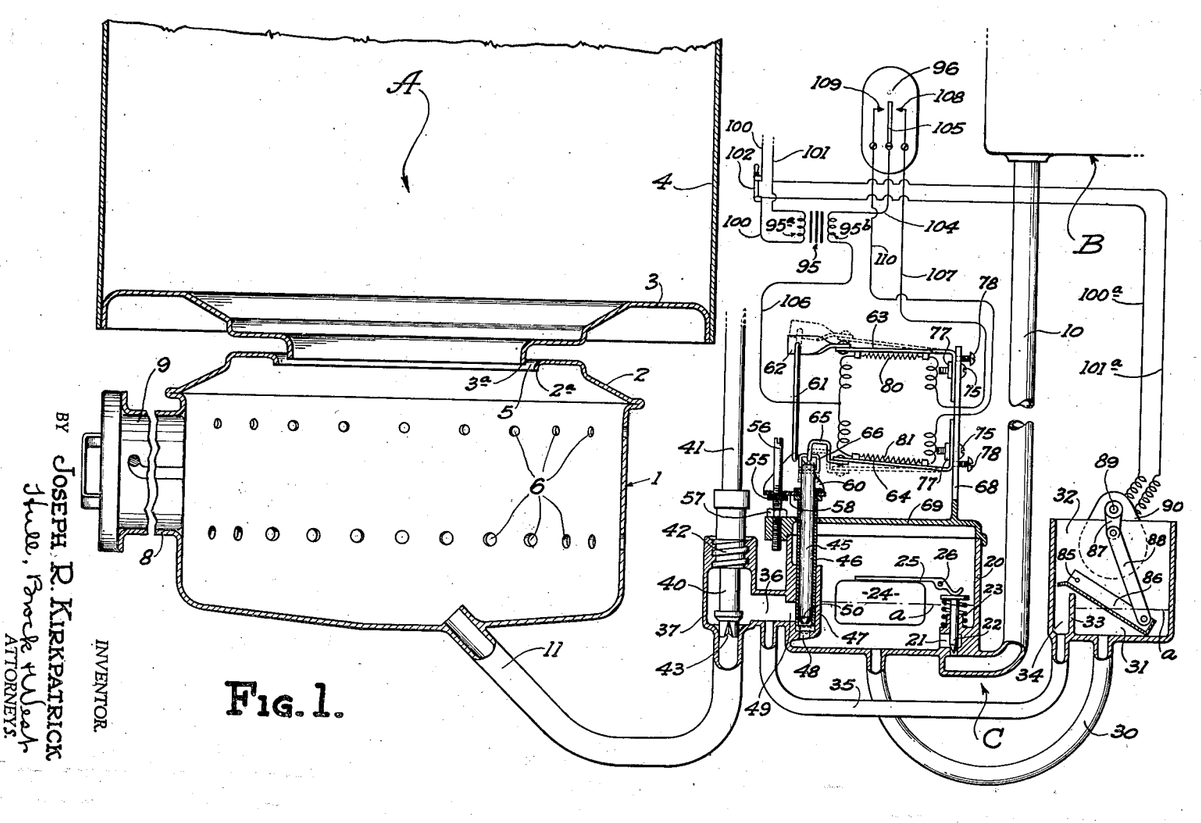
Fig. 1 is a diagrammatic representation of a liquid fuel burning apparatus incorporating a form of the invention characterized by a fuel feeding and governing system in which the fuel is volumetrically fed to the burner in sufficient quantity to sustain operation at low fire, while the supply of additional fuel for producing higher fire is valve-controlled.

Through a conduit 30, the float chamber communicates with a receiving compartment or reservoir 31 of a vessel 32, said compartment being separated by a partition 33 from an outlet compartment 34. Said partition constitutes a form of barrier that separates the system C into a reservoir part to which fuel is supplied from the source B, and a delivery part from which fuel flows by gravity to the burner A, as will hereinafter more fully appear. By the arrangement shown and described, the same liquid level prevails at all times within the float chamber 20 and receiving compartment 31 of the vessel 32, the space thus represented constituting the reservoir part of the system, hereinbefore referred to; and the float, with the valve 22, forms the liquid level control that governs the elevation of the liquid in said part.

The outlet compartment 34 of the vessel 32 communicates, through a conduit 35, with a passage 36 between the float chamber 20 and a valve casing 37 whose outlet joins the previously mentioned conduit 11 that leads to the burner. Operating within the casing 37 is a so-called metering valve 40 that is adapted to be manually adjusted between full open and closed positions by appropriate means including a stem 41. The valve 40, shown as having the usual thread connection 42 with the valve casing, is provided with a graduated notch 43 by which the flow through the valve may be accurately controlled when the valve is in any other than full open or closed positions. The outlet compartment 34, conduit 35, passage 36, and valve casing 37 that joins the conduit 11 constitute the previously mentioned delivery part of the fuel feeding and governing system.

Direct flow of fuel from the float chamber 20 to the passage 36 is controlled by two valves 45 and 46, shown as tubes or sleeves slidably fitted one within the other, the outer valve being similarly fitted within a valve casing 47 shown as an integral part of the float chamber. Said valve casing 47 communicates with the interior of the float chamber through a port 48, and with the passage 36 through a port 49. When the inner tubular valve 45 is fully depressed its lower end shuts off communication between the valve casing and the float chamber through the port 48. Communication between the valve casing and the port 49 is controlled by the valve 46, the lower end of which is formed with a V notch 50. As will more fully appear hereinafter, the supply of additional fuel to the burner for producing intermediate and high fires is controlled by the valve 46, and when in position to pass the additional quantity necessary to produce intermediate fire only a limited portion of the area of the V notch 50 extends above the bottom edge of the port 49. The descent of the valve 46 is limited by a stop, and preferably this stop is adjustable so that the size or volume of the so-called intermediate fire may be varied. According to the present embodiment of the invention, the stop, designated 55, consists of a collar on a stud 56 that is threaded through a part on the valve chamber 20 and is adapted to be locked in any adjusted position by a nut 57. The portion of the stud above the stop 55 extends freely through an aperture in a plate 58 that is suitably fastened to the upper end of the tubular valve 46 and comprises a part of a yoke 60.

The valve 46 has operative connection, through the yoke 60, a link 61, and a member 62 with the free end of a thermostatic element 63, consisting of a bi-metal strip; and the valve 45 is attached to the free end of a similar thermostatic element 64, through a member 65 and link 66. The elements or strips 63 and 64 have their inner ends adjustably connected to a standard 68 that rises from the cover 69 of the float chamber 20. Adjustment of the strip with respect to the standard is accomplished through screws 75 that pass freely through holes in the standard and in the laterally turned end portions of the elements or strips and are threaded through bars 77, and screws 78 that are threaded through the standard 68 and bear against the elements or strips in properly spaced relation to the screws 75. By relatively adjusting the screws 75 and 78 associated with each element, such element may be rocked to vary its normal angular relation to the standard 68 and consequently change the normal positions of the valves 45 and 46.

Suitably attached to the respective thermostatic elements or strips 63 and 64 are electric heaters 80 and 81 in the form of coils of resistance wire; and when said heaters are "cold" the elements or strips occupy the positions in which they are shown in full lines in Fig. 1 thereby to retain the valve 45 open and the valve 46 in the position determined by the stop 55—that is, in the position when the minimum portion of the area of the notch 50 is uncovered, or above the bottom edge of the port 49.

Supported by the vessel 34 for oscillation upon a pivot 85 is a trough-like bucket or dipper 86. It will be observed that the pivot 85 is above and in the region of the partition 33, and that the adjacent open end of the dipper is thus disposed over the outlet compartment 34. The opposite, closed end of the dipper is adapted to be raised and lowered between a position adjacent the bottom of the compartment 31 and a position above the horizontal plane of the pivoted end of the dipper by a crank 87 to the pin of which the free end of the dipper is attached through a connecting rod or link 88. The crank 87 is secured to the shaft 89 of a small electric motor 90 that is suitably supported, as being fastened to the side of the vessel 32.

The fuel feeding and governing system is desirably automatically controlled by an electric system including a transformer 95 and a so-called room thermostat 96 that is subjected to the temperature of the space that is heated by the apparatus. The two legs of a main or house circuit of 110 volts, for example, are represented by conductors 100 and 101 that are connected, respectively, to the opposite ends of the primary winding 95$^a$ of the transformer. The conductor 100 includes a switch 102, and a branch of said main or house circuit, represented by conductors 100$^a$ and 101$^a$, leads to the previously mentioned motor 90. One side of the secondary winding 95$^b$ of the transformer has connection, through a conductor 104, with the movable contact element 105 of the room thermostat 96, such element swinging in response to changes in temperature, as is well understood by those familiar with control systems of the kind in question. The opposite side of the secondary winding 95$^b$ is connected, through a conductor 106, with one end of the heaters 80 and 81 that are attached to the thermostatic elements or strips 63 and 64, respectively. The opposite end of the heater 80 is connected, through a conductor 107, with the contact point 108 of the room thermostat, while the opposite contact point 109 of said thermostat has connection, through the conductor 110, with the corresponding end of the heater 81.

From the source B, liquid fuel is conveyed by the conduit 10 to the reservoir part of the system comprised of the float chamber 20, conduit 30, and receiving compartment 31 of the vessel 32; and, under the influence of the liquid level control comprising the float 24 and valve 22, the fuel stands at approximately the level represented by the dot-and-dash lines a, a of Fig. 1. This level is well below the top of the partition 33, wherefore fuel is prevented from gravitating from the compartment 31 to the outlet compartment 34, and thence through conduit 35, etc., to the burner. With the valve 45 normally in open position, as illustrated in the drawings, fuel is permitted to flow, under restraint of the valve 46, from the float chamber 20 through ports 48 and 49, passage 36, valve casing 37 and conduit 11 to the burner A, it being assumed, of course, that the metering valve 40 is open to a greater or less extent.

With the switch 102 closed, current is supplied to the transformer 95 and to the motor 90. Under the constant action of the motor 90 the dipper 86 will be oscillated on its pivot 85 to intermittently transfer measured quantities of fuel from the reservoir part of the system—or more specifically, from the compartment 31—to the delivery part of the system—including the outlet compartment 34—from where the fuel will flow by gravity to the burner. The fuel thus volumetrically fed from the reservoir part of the system to the burner in sufficient quantity to sustain operation at low fire, is augmented by the fuel that normally passes valves 45 and 46 from the float chamber to the passage 36, the aggregate amount of fuel thus being supplied to the burner being sufficient to maintain operation at what has been termed intermediate fire. In other words, with the system operating under normal conditions, the fire is kept at intermediate stage. Under these circumstances the apparatus produces enough heat to maintain, against the influence of a lower outside temperature, a room or space temperature within a predetermined range for which the thermostat 96 is set, it being understood that said thermostat is of the customary form capable of adjustment to vary the value and range of the controlled temperature.

When the room or space temperature rises above the aforesaid predetermined range, the element 105 will swing to the left into engagement with contact point 109 thereby to close the circuit that includes the secondary winding of the transformer and the heater 81; and when the elevated temperature of the energized heater 81 acts upon the thermostatic element or strip 64 it will cause said element or strip to warp to the position indicated by dotted lines in Fig. 1 thereby to depress and close the valve 45 shutting off the flow of fuel from the float chamber directly to the passage 36 and thence to the burner. While this condition prevails, the only fuel supplied to the burner is that volumetrically fed by the dipper 86, and with the fuel supply thus reduced the burner will operate at low fire, causing the temperature to which the room thermostat is subjected to fall. When the temperature recedes a few degrees the element 105 will swing back to neutral position opening the circuit to heater 81 and allowing the thermostatic element or strip 64 to cool and return to normal position wherein it retains the valve 45 open, allowing the burner to proceed at intermediate fire.

Under a drop in room temperature sufficient to cause the element 105 of the room thermostat to swing over into engagement with the contact 108, the circuit including the secondary winding of the transformer and the heater 80 will be closed, and when the elevated temperature of the energized heater acts upon the thermostatic element or strip 63 it will cause the latter to assume the position shown in dotted lines in Fig. 1 thereby, through the link 61 and yoke 60, to lift the valve 46 so as to increase the flow of fuel from the float chamber through the ports 48 and 49 to the passage 36 and thence to the burner, causing the burner to operate at high fire, and under the influence of the additional heat generated by the apparatus the temperature affecting the room thermostat 96 will be raised enough to cause the element 105 to resume neutral position and open the circuit to the heater 80, after which the system will resume normal operation with the burner operating at intermediate fire.

Attention is directed to the fact that, in the form of the invention above described, should the electric power fail from any cause, resulting in the stopping of the motor 90 and the dipper 86 so that volumetric feeding of the fuel ceases, a flow of fuel in sufficient amount to sustain operation of the burner at relatively low fire will be insured by reason of the open position occupied under such circumstances by the valves 45 and 46. In other words, upon failure of the power—the same as when the room thermostat 96 is in neutral condition, and the circuits controlled thereby are open—the volumetric feeding means is by-passed through the valve controlled ports 48 and 49.

In a practical application of the invention according to the form disclosed in Fig. 1, the elements of the fuel feeding and governing system C assume the physical form and relation illustrated in Figs. 2 to 6; and the corresponding parts of the system appearing in Fig. 1 and in Figs. 2 to 6 are designated by the same reference numerals.

Figure 2:
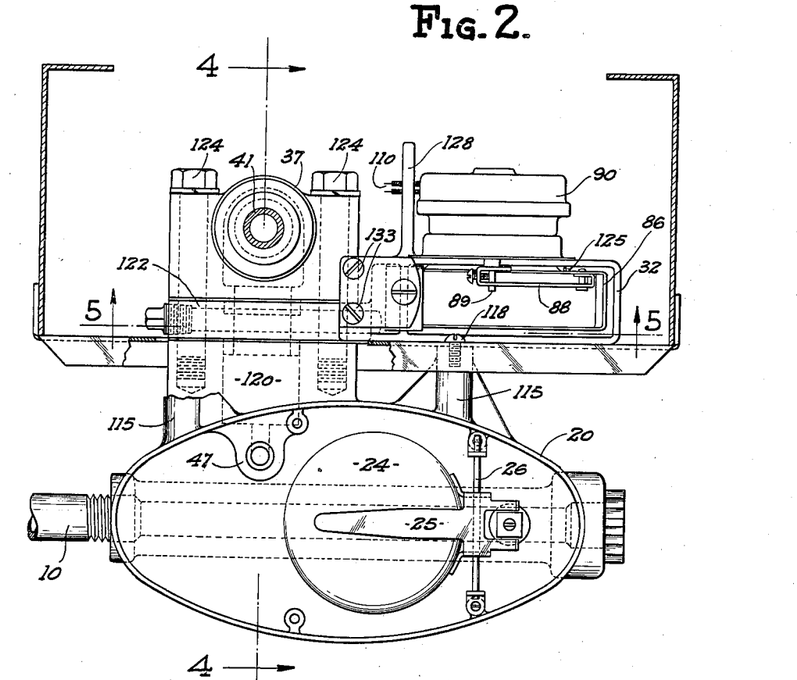
Fig. 2 is a sectional plan of the structural unit embodying the fuel feeding and governing system of the form of the invention shown in Fig. 1, the construction being that employed in practice, and the view showing the cover of the float chamber removed.
Figure 4:
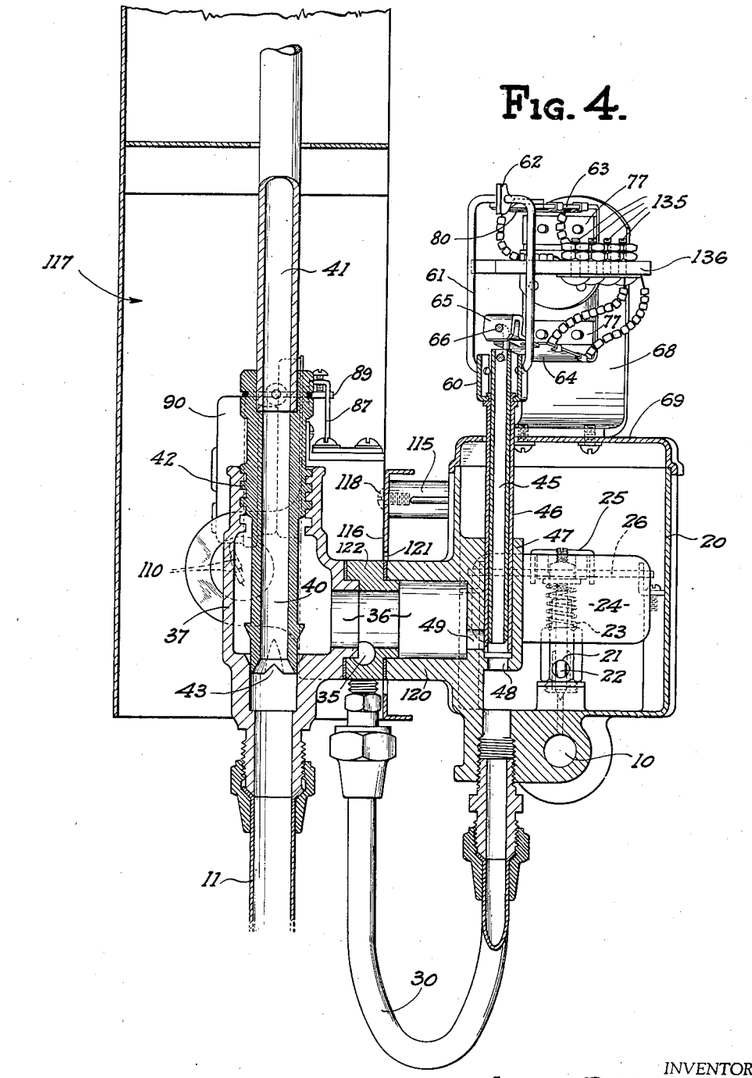
Fig. 4 is a vertical section through the aforesaid unit on the line 4—4 of Fig. 2.
Figures 5, 6:
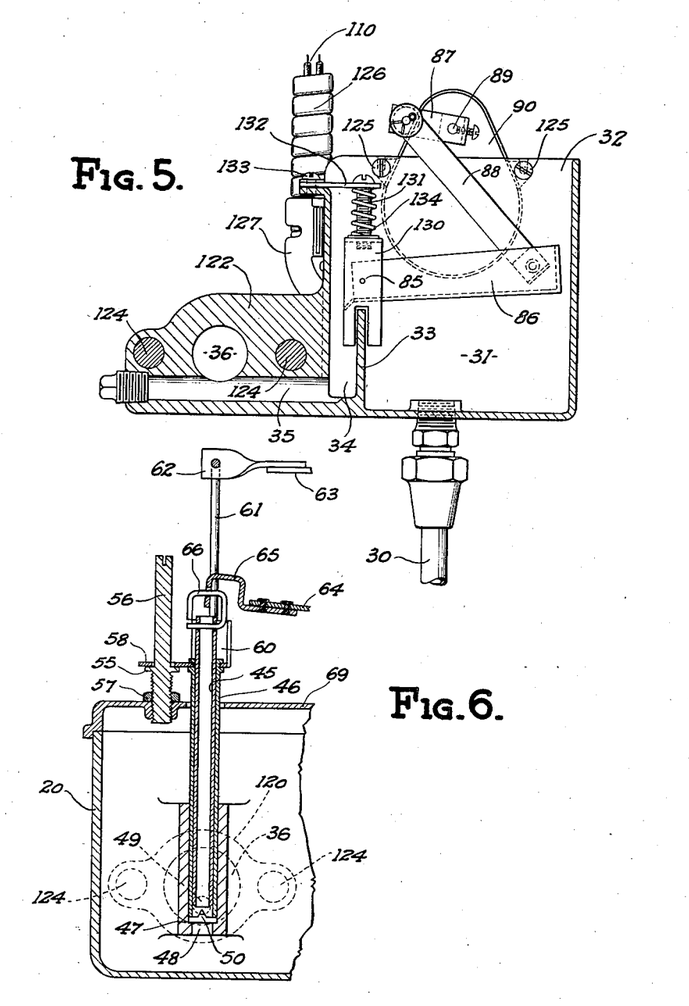
Fig. 5 is a sectional detail of the reservoir, dipper and associated parts of the volumetric fuel feed of the aforesaid unit, the slightly offset planes of section being indicated by the line 5—5 of Fig. 2.
Fig. 6 is a sectional detail substantially on the line 6—6 of Fig. 3 and showing the valves for controlling the supply of fuel for intermediate and high fires.

As shown in Figs. 2 and 4, the float chamber 20, through a suitable number of laterally extending bosses 115, is secured to a wall 116 of a supporting structure designated, generally, 117, the connection between each boss 115 and said wall 116 being made by a screw 118. A relatively large hollow boss 120 extends laterally from the float chamber into an opening 121 of the wall 116, and in the plane of said wall has a leak-proof connection with a ported arm 122 of a casting that includes, as an integral part thereof, the previously mentioned vessel 32 (Fig. 5). To the opposite side of the arm 122 is fastened, with a leak-proof joint, the inlet boss of the previously mentioned valve casing 37. These three units are bound together by screws 124 that pass through aligned apertures in the valve casing 37 and in the arm 122, and are threaded into tapped holes in the boss 120 of the valve chamber. The motor 90 is shown (Figs. 2 and 5) as fastened, by screws 125, to one of the side walls of the vessel 32, and the electrical conductors through which current is supplied to the motor is sheathed in a conduit 126 having a terminal elbow fitting 127, fastened to a bracket 128 that extends laterally from and is integral with the vessel 32. The pivot 85 of the dipper 86 is supported by and between the opposite branches of a U-shaped member 130, said branches being bifurcated at their lower ends for engagement over the upper edge of the partition 33, as clearly shown in Fig. 5. The member 130 is supported by a screw 131 from an overhanging bracket 132 that is fastened, as by means of screws 133, to the flanged top of the adjacent end wall of the vessel 32. A spring 134 surrounds the screw 131 and is interposed between the member 130 and the overhanging bracket 132. The screw 131, being free in the bracket and threaded into the member 130, provides a convenient means of adjusting the member vertically thereby to alter the elevation of the front end of the dipper 86 and thus change its feeding capacity.

As indicated in Fig. 4, the registering openings of the inlet extension of the valve casing 37, arm 122 and boss 120 constitute the previously mentioned passageway 36; and the bore in the arm 122 through which said passageway communicates with the outlet compartment 34 of the vessel 32 corresponds to the conduit 35 and accordingly is designated by the same reference numeral.

Figure 3:
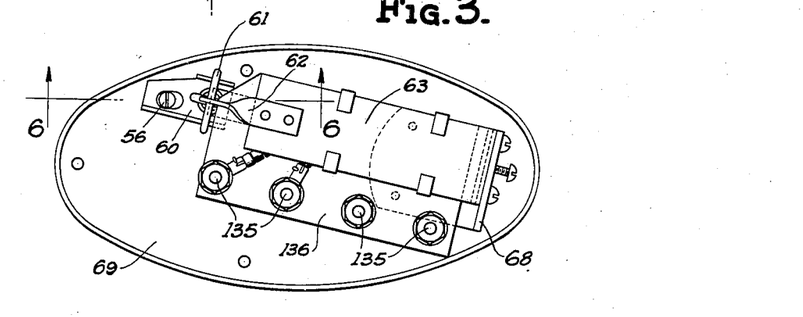
Fig. 3 is a plan view of the cover of the float chamber and the valve actuating means mounted thereon.

The electrical connections to the heaters 80 and 81 are, in practice, made through binding posts 135 (Figs. 3 and 4), that are carried by a shelf 136 of insulating material, suitably fastened to and supported from the standard 68 that rises from the cover 69 of the float chamber, the cover, with the parts mounted thereon, being shown in Fig. 3 as removed from the chamber.

In the fuel feeding and governing system D, shown diagrammatically in Fig. 7, the fuel is conducted from the source B through the conduit 10 to a float chamber 140, said conduit communicating with the chamber through a port 141. The passage of fuel through said port is controlled by a valve 142 that is depressed and closed by a float 143 through the intervention of a lever 144, fulcrumed on a pivot pin 145 that is fixed with respect to the float chamber. A spring 146 tends to open the valve in opposition to the action of the float. By this control means, the level of liquid in the reservoir part of the system is maintained substantially at the elevation indicated by the dot-and-dash line $a'-a'$.

What has been referred to as the reservoir part of the system includes, also, the receiving compartment or reservoir 150 of a vessel 151, said compartment being separated from an outlet compartment 152 by a partition 153 that extends a material distance above the liquid level. Communication between the float chamber and the receiving compartment 150 is established through a conduit 155. The outlet compartment 152 of the vessel 151 is communicatively connected to the burner A through the conduit 11; and a by-pass between the reservoir part of the system—specifically, conduit 155—and the delivery part of the system is provided by a conduit 157 that contains valve means comprising a casing 158 and a valve member 159, the latter being in the form of a tube, similar to the valve 46 of the previously described embodiment of the invention, and having a V-notch 160 at its lower end in the region of the diaphragm 161 of the valve casing. The casing includes a sleeve wherein the stem portion of the valve member is housed and whose open top is a substantial distance above the maximum liquid level in the system. The valve is normally held in closed position by a solenoid 165, while a spring 166 tends to shift the valve to open position when the solenoid is de-energized, these actuating elements being shown as operatively connected to the valve through the medium of a bell crank 167. The full open position of the valve is determined by an adjustable stop 168.

Supported by the vessel 151 a material distance above the partition 153 is a channel bar 170 (Fig. 8), through square holes in the bottom flange of which are guided for vertical adjustment hangers 171. The hangers, being square in cross section and of a size to slidably fit the holes, are adjustably supported by screws 172 that are threaded into axial recesses in the upper ends of the hangers and extend freely through holes in the top flange of the bar 170. Pivotally connected to the lower ends of the hangers 171 are the trough-like buckets or dippers 175, 176 and 177, the size and capacity of the last mentioned dipper being considerably greater than the dipper 176, while the dipper 176 is of somewhat greater capacity than the dipper 175. The dipper 175 corresponds in purpose and action to the dipper 86 of the previously described embodiment of the invention, serving as it does to supply fuel to the burner in sufficient quantity to sustain operation at low or pilot fire. As will more fully appear hereinafter, the dipper 176 supplies the additional fuel necessary to sustain operation of the burner at intermediate fire, while the dipper 177 further increases the fuel supply to that necessary to cause the burner to operate at high fire.

Figure 8:
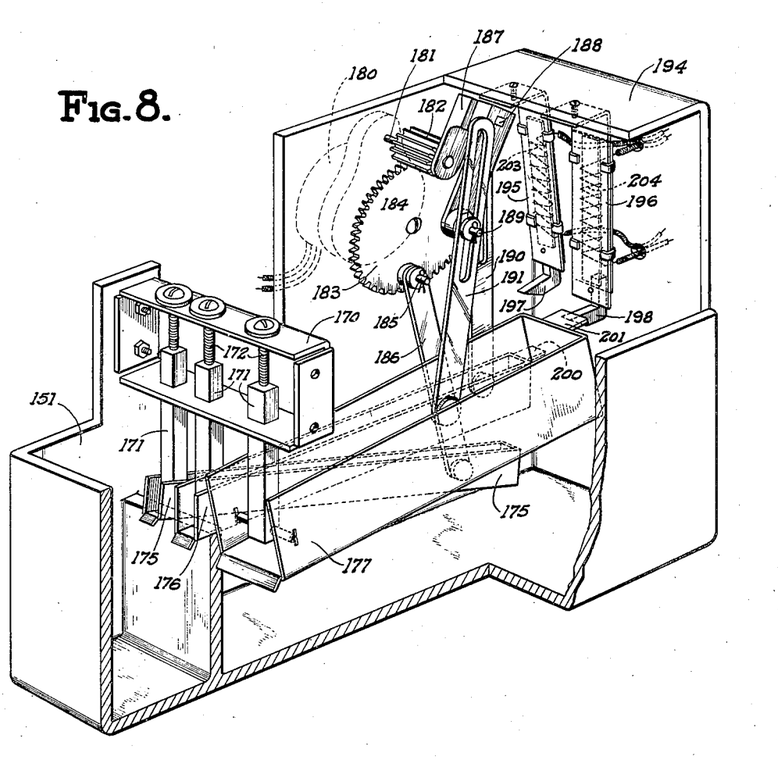
Fig. 8 is a detail in perspective, with parts broken away, of the multiple volumetric fuel feed of the latter modification.

Shown as supported by and exteriorly of an upwardly extended portion of one of the side walls of the vessel 151 is an electric motor 180 whose drive shaft 181 is extended through an aperture in the wall extension and has fastened to it a pinion 182 that meshes with a spur gear 183, journaled on a stud 184 that extends inwardly from said wall extension. A crank pin 185 on the gear 183 is operatively connected to the dipper 175, near the free end of the latter, by a connecting rod or link 186. Fastened to the outer end of the motor shaft 181, beyond the pinion 182, is a double crank 187, the diametrically opposed pins whereof are designated 188 and 189. These respective crank pins extend freely through slots in connecting rods or links 190 and 191, the former being attached to the bucket 176 and the latter to the bucket 177.

Secured to and depending from an overhanging portion 194 of the upwardly extended end wall of the vessel 151 are thermostatic elements or bi-metal strips 195 and 196, by the lower free ends of which are carried latch members 197 and 198, respectively, for holding engagement with extensions 200 and 201 on the respective dippers 176 and 177. Electric heaters 203 and 204, in the nature of resistance coils, are suitably attached to the respective thermostatic elements or strips 195 and 196. When the thermostatic elements or strips are cold, so to speak, they occupy the positions indicated in the drawings, element 196 being in a position to cause the latch member 198 thereof to engage beneath the extension 201 and sustain the dipper 177 in elevated position; while the element or strip 195 is normally in a position to retain the latch member 197 beyond reach of the extension 200 of dipper 176.

The electric circuit of the automatic control system for the apparatus includes a transformer 210, and a room thermostat 211. The two legs of the main or house circuit of 110 volts, for example, are represented by the conductors 212 and 213, the former including a switch 214. This circuit also includes the winding of the previously mentioned solenoid 165. One branch of the main circuit, represented by conductors 212a and 213a, includes the primary winding 210a of the transformer 210, while a second branch, constituted of conductors 212b and 213b, leads to the motor 180. One side of the secondary winding 210b of the transformer is connected, through a conductor 215, with the movable contact element 216 of the room thermostat, while the other side of said winding has connection, through the conductor 217, with the heaters 203 and 204. The former heater is placed in circuit, through a conductor 218, with the contact 219 of the room thermostat, while contact 220 thereof is connected, through the conductor 221, with the heater 204.

The burner, under given conditions which may be regarded as normal, operates on fuel supplied by the two dippers 175 and 176, the heat produced by the apparatus under these circumstances being sufficient to maintain a room temperature of the desired range, under the influence of which the movable contact element 216 of the room thermostat remains in neutral position. Should the room temperature rise beyond the predetermined range, the movable contact element 216 will swing to the left and engage contact 219, closing the circuit to the heater 203 and under the influence of the energized heater the thermostatic element 204 will warp in the direction to bring the latch member 197 into the path of the extension 200 thereby to retain the dipper 176 in inactive, elevated position while the crank pins 188 and 189 play idly within the slots in the connecting rods or links 190 and 191. This leaves only the dipper 175 in operation, and this will supply sufficient fuel to the burner to sustain operation thereof at low fire. Under these circumstances and the influence of a relatively lower outside temperature, the room temperature will drop, causing the movable element 216 to withdraw from the contact 219, thereby to interrupt the supply of current to the heater 203, allowing the thermostatic element 204 to cool and withdraw the latch member 197 from the extension 200, thus throwing the dipper 176 back into operation.

In the event the outside temperature continues to fall, similarly affecting the room temperature sufficiently to cause the movable contact element 216 of the room thermostat to swing over into engagement with contact 220, a circuit will be established through heater 204, causing it to warp the thermostatic element or bi-metal strip 196 in a direction to withdraw the latch member 198 from holding engagement with the extension 201, freeing the dipper 177 so that it may be oscillated through the action of the crank 189, thereby to increase the fuel supply and cause the burner to operate at high fire, this condition continuing until the temperature affecting the room thermostat has risen to within the aforesaid predetermined range, under which circumstances the contact element 216 will withdraw from contact 220, opening the circuit to the heater 204 so that the thermostatic element or strip 196 may cool and resume its former position wherein the latch member 198 engages the extension 201 and retains the dipper 177 elevated and out of operation.

Should the electric circuit that supplies current to the automatic control system fail from any cause, thereby to de-energize the motor 180 and throw the fuel feeding and governing system out of commission, the solenoid 165 will likewise be de-energized, whereupon the spring 166 will open the emergency valve, permitting a practical amount of fuel to by-pass the multiple volumetric feed comprising the buckets 175, 176 and 177 and sustain operation of the burner until the difficulty is rectified and the system returned to normal operation. Through the adjustable stop 168 the emergency valve 159 may be set to feed fuel in sufficient quantity to sustain operation of the burner at a stage equivalent to intermediate fire.

Attention is called to the fact that the tops of the valve casings 37, 47 and 158 are a substantial distance above the maximum liquid level in the systems of which they form parts, wherefore stuffing boxes or other seals are rendered unnecessary and freedom of action of the valves is assured.

Having thus described my invention, what I claim is:

1. In combination, a vessel having a projecting arm provided with a transverse horizontal through passage and a port establishing communication between said passage and the interior of the vessel so arranged that liquid may gravitate from the vessel to said passage, a liquid level control means including a chamber having a lateral hollow boss joined to one side of said arm with its opening communicating with said passage, a valve casing whose inlet branch is joined to the opposite side of said arm in communication with said passage, a partition dividing the vessel into a receiving compartment and a delivery compartment with the latter of which the aforesaid port communicates, the partition extending from the bottom of the vessel to above the maximum liquid level therein, communicative connections between the chamber of the liquid level control means and said receiving compartment so arranged that the same liquid level prevails in both, means for transferring measured quantities of liquid from the receiving compartment to the delivery compartment, and valve means through which communication is established and controlled between said chamber and the aforesaid passage.

2. In combination, a liquid fuel burner, a source of liquid fuel supply, a fuel feeding system through which said source communicates with said burner, a barrier separating said system into a reservoir part to which fuel flows from said source and a delivery part from which fuel flows to the burner, power operated means acting to periodically transfer measured amounts of fuel from the reservoir part past said barrier to the delivery part in sufficient quantity to sustain operation of the burner at low fire, communicative connections including a valve casing interposed between said source and said burner and by-passing said barrier, a pair of valve members operable within said casing and cooperating to control the passage of fuel therethrough, said valve members being movable to three different relative positions in the first of which the passage through the valve casing is closed, in the second of which the passage through the valve casing is partially open, and in the third of which said passage is entirely open, and thermostatically controlled means for moving said valve members.

3. In combination, a liquid fuel burner whose operating range includes low, intermediate and high fires, a source of liquid fuel supply, a fuel feeding system, a barrier separating said system into a reservoir part to which fuel flows from the source and a delivery part from which fuel flows to the burner, power operated means acting to periodically transfer measured amounts of fuel from the reservoir part past the barrier to the delivery part in sufficient quantity to sustain operation of the burner at low fire, further means for effecting delivery of additional fuel from the source to the burner and capable of two conditions in the first of which it adds enough fuel to produce intermediate fire, and in the second of which it further increases the fuel supply thereby to produce high fire, an automatic control therefor including thermostatic means subjected to the temperature of the space heated by said burner, the said further means being in said first condition and said thermostatic means being in neutral condition when the temperature of said space is within a given range, operative connections between the thermostatic means and the said further means whereby, when the temperature of said space rises above said given range, it will cause said further means to become inactive and, when the temperature of said space drops below said given range, it will cause the said further means to assume second condition, and manually adjustable valve means interposed between said source and said burner to limit the maximum quantity of fuel that can pass from said source to said burner.

4. In combination, a liquid fuel burner whose operating range includes low, intermediate and high fires, a source of liquid fuel supply, a fuel feeding system including two branches through which said source communicates with the burner, means acting to volumetrically feed fuel through one of said branches in sufficient quantity to sustain operation of the burner at low fire, a valve casing constituting a part of the other branch, two valve members within said casing cooperating to control the passage of fuel through the casing, two thermosensitive elements each operatively connected to one of said valve members for imparting movement thereto as said element is affected by changes in temperature, two electric heaters each in intimate heat exchanging relation to one of said thermosensitive elements, a thermostatic switch subjected to the temperature of the space heated by the burner, electric circuits including said heaters and switch, said valve members being so related and adjusted that when neither heater is energized the valve members will occupy positions permitting a quantity of fuel to flow through the valve casing which, with that being volumetrically fed, will sustain operation of the burner at intermediate fire, one of said thermosensitive elements responding to the elevated temperature of the heater associated therewith when the latter is energized to cause the corresponding valve member to close the passage through the valve casing, the other thermosensitive elements responding to the elevated temperature of the heater associated therewith when the latter is energized to cause the other valve member to assume a position in which the passage through the valve casing is fully opened, and manually adjustable valve means interposed between said source and said burner to limit the maximum quantity of fuel that can pass from said source to said burner.

5. In combination, a liquid fuel burner, a source of liquid fuel supply, a fuel feeding system through which said source communicates with the burner, the same comprising means acting to volumetrically feed fuel from said source to said burner in sufficient quantity to sustain operation of the burner at low fire, a valve casing interposed between said source and said burner in parallel with said volumetric fuel feeding means, a pair of valve members reciprocable within said casing and cooperating to control the passage of fuel therethrough, two thermosensitive elements each operatively connected to one of said valve members for imparting reciprocatory movement thereto when said element is affected by changes in temperature, two electric heaters each in intimate heat exchanging relation to one of said thermosensitive elements, a thermostatic switch subjected to the temperature of the space heated by said burner, electric circuits including said heaters and switch, the latter being adapted to selectively close said circuits thereby to energize either electric heater in response to changes in said temperature, said valve members being adjusted so that when neither heater is energized and the thermosensitive elements are accordingly unaffected thereby sufficient additional fuel will be permitted to flow through the aforesaid valve casing to sustain operation of the burner at medium fire, one of said thermosensitive elements being arranged to cause the corresponding valve member to close the passage through the valve casing when the heater associated therewith is energized, the other thermosensitive element being so arranged that when the heater associated therewith is energized the corresponding valve member will be moved to a position in which the passage through the valve casing will be fully opened, and manually adjustable valve means interposed between said source and said burner to limit the maximum quantity of fuel which can pass from said source to said burner.

JOSEPH R. KIRKPATRICK.